(12) United States Patent
Taboriskiy et al.

(10) Patent No.: US 9,876,741 B1
(45) Date of Patent: Jan. 23, 2018

(54) METHODS, SYSTEMS, AND MEDIA FOR FACILITATING USER INTERACTIONS WHILE WATCHING MEDIA CONTENT

(71) Applicant: Google Inc., Mountain View, CA (US)

(72) Inventors: Alexander Taboriskiy, Zurich (CH); Vincent Dureau, San Francisco, CA (US); Joon-Hee Jeon, Palo Alto, CA (US); Jonathan Terleski, Mountain View, CA (US); John Thomas, Mountain View, CA (US)

(73) Assignee: Google Inc., Mountain View, CA (US)

( * ) Notice: Subject to any disclaimer, the term of this patent is extended or adjusted under 35 U.S.C. 154(b) by 281 days.

(21) Appl. No.: 14/811,399

(22) Filed: Jul. 28, 2015

(51) Int. Cl.
*G06F 3/00* (2006.01)
*H04L 12/58* (2006.01)
*G06F 3/0482* (2013.01)
*G06F 3/0484* (2013.01)
*H04L 29/08* (2006.01)

(52) U.S. Cl.
CPC .......... *H04L 51/046* (2013.01); *G06F 3/0482* (2013.01); *G06F 3/04842* (2013.01); *H04L 67/10* (2013.01)

(58) Field of Classification Search
CPC . H04L 12/581; H04L 12/1813; H04L 51/046; G06F 3/0482; G06F 3/04842
See application file for complete search history.

(56) References Cited

U.S. PATENT DOCUMENTS

| | | | |
|---|---|---|---|
| 8,700,714 B1 | 4/2014 | Pan et al. | |
| 2009/0307614 A1* | 12/2009 | Craig | G06Q 10/107 715/758 |
| 2012/0144416 A1* | 6/2012 | Wetzer | H04N 21/25816 725/14 |
| 2013/0198642 A1* | 8/2013 | Carney | G06F 3/0484 715/738 |

* cited by examiner

*Primary Examiner* — Omar Abdul-Ali
(74) *Attorney, Agent, or Firm* — Byrne Poh LLP

(57) ABSTRACT

Methods, systems, and media for facilitating user interactions while watching media content are provided. In accordance with some embodiments, the method comprises: associating a first user device with a second user device, wherein the first user device and the second user device are associated with a first user; causing, on the first user device, a media content item to be presented; receiving an indication that the media content item is being presented on a third user device associated with a second user; causing, on the first user device, a selectable indication that the media content item is being presented on the third user device to be presented; and in response to determining that the selectable indication has been selected on the first user device, causing a communication interface for exchanging messages between the second user device and the third user device to be presented on the second user device.

15 Claims, 12 Drawing Sheets

METHODS, SYSTEMS, AND MEDIA FOR FACILITATING USER INTERACTIONS WHILE WATCHING MEDIA CONTENT

TECHNICAL FIELD

The disclosed subject matter relates to methods, systems, and media for facilitating user interactions while watching media content.

BACKGROUND

People often watch media content items and may be interested in discussing media content that they are currently viewing with friends who are also viewing the same media content. For example, a person who is currently viewing a television program associated with an event (e.g., a political debate, a game, an awards ceremony, etc.) may be interested in discussing the event with a friend who happens to be viewing the same television program at the same time. However, it can be difficult to determine what media content a friend has viewed recently or is currently viewing.

Accordingly, it is desirable to provide methods, systems, and media for facilitating user interactions while watching media content.

SUMMARY

Methods, systems, and media for facilitating user interactions while watching media content are provided.

In accordance with some embodiments of the disclosed subject matter, a method for facilitating user interactions while watching media content is provided, the method comprising: associating a first user device with a second user device, wherein the first user device and the second user device are associated with a first user; causing, on the first user device, a media content item to be presented; receiving an indication that the media content item is being presented on a third user device associated with a second user, wherein the second user is connected to the first user; causing, on the first user device, a selectable indication that the media content item is being presented on the third user device to be presented; and in response to determining that the selectable indication has been selected on the first user device, causing a communication interface for exchanging messages between the second user device and the third user device to be presented on the second user device.

In accordance with some embodiments of the disclosed subject matter, a system for facilitating user interactions while watching media content is provided, the system comprising: a hardware processor that is programmed to: associate a first user device with a second user device, wherein the first user device and the second user device are associated with a first user; cause, on the first user device, a media content item to be presented; receive an indication that the media content item is being presented on a third user device associated with a second user, wherein the second user is connected to the first user; cause, on the first user device, a selectable indication that the media content item is being presented on the third user device to be presented; and in response to determining that the selectable indication has been selected on the first user device, cause a communication interface for exchanging messages between the second user device and the third user device to be presented on the second user device.

In accordance with some embodiments of the disclosed subject matter, a non-transitory computer-readable medium containing computer-executable instructions that, when executed by a processor, cause the processor to perform a method for facilitating user interactions while watching media content, is provided. The method comprises: associating a first user device with a second user device, wherein the first user device and the second user device are associated with a first user; causing, on the first user device, a media content item to be presented; receiving an indication that the media content item is being presented on a third user device associated with a second user, wherein the second user is connected to the first user; causing, on the first user device, a selectable indication that the media content item is being presented on the third user device to be presented; and in response to determining that the selectable indication has been selected on the first user device, causing a communication interface for exchanging messages between the second user device and the third user device to be presented on the second user device.

In accordance with some embodiments of the disclosed subject matter, a system for facilitating user interactions while watching media content is provided, the system comprising: means for associating a first user device with a second user device, wherein the first user device and the second user device are associated with a first user; means for causing, on the first user device, a media content item to be presented; means for receiving an indication that the media content item is being presented on a third user device associated with a second user, wherein the second user is connected to the first user; means for causing, on the first user device, a selectable indication that the media content item is being presented on the third user device to be presented; and in response to determining that the selectable indication has been selected on the first user device, means for causing a communication interface for exchanging messages between the second user device and the third user device to be presented on the second user device.

In some embodiments, the system further comprises means for causing contents of the communication interface to be presented on a fourth user device associated with a third user.

In some embodiments, the system further comprises means for receiving indications of sentimental information associated with a particular message presented in the communication interface, wherein the sentimental information is used for ranking the particular message.

In some embodiments, the system further comprises: means for aggregating indications of sentimental information associated with the particular message presented in the communication interface; and means for presenting an aggregated feed of messages including the particular message based on the aggregated indications of sentimental information.

In some embodiments, the system further comprises means for aggregating indications of sentimental information associated with a user who sent the particular message presented in the communication interface.

In some embodiments, the system further comprises: means for determining that presentation of the media content item has finished; and in response to determining that presentation of the media content item has finished, means for causing the communication interface to be closed.

BRIEF DESCRIPTION OF THE DRAWINGS

Various objects, features, and advantages of the disclosed subject matter can be more fully appreciated with reference to the following detailed description of the disclosed subject

DETAILED DESCRIPTION

Figure 1:
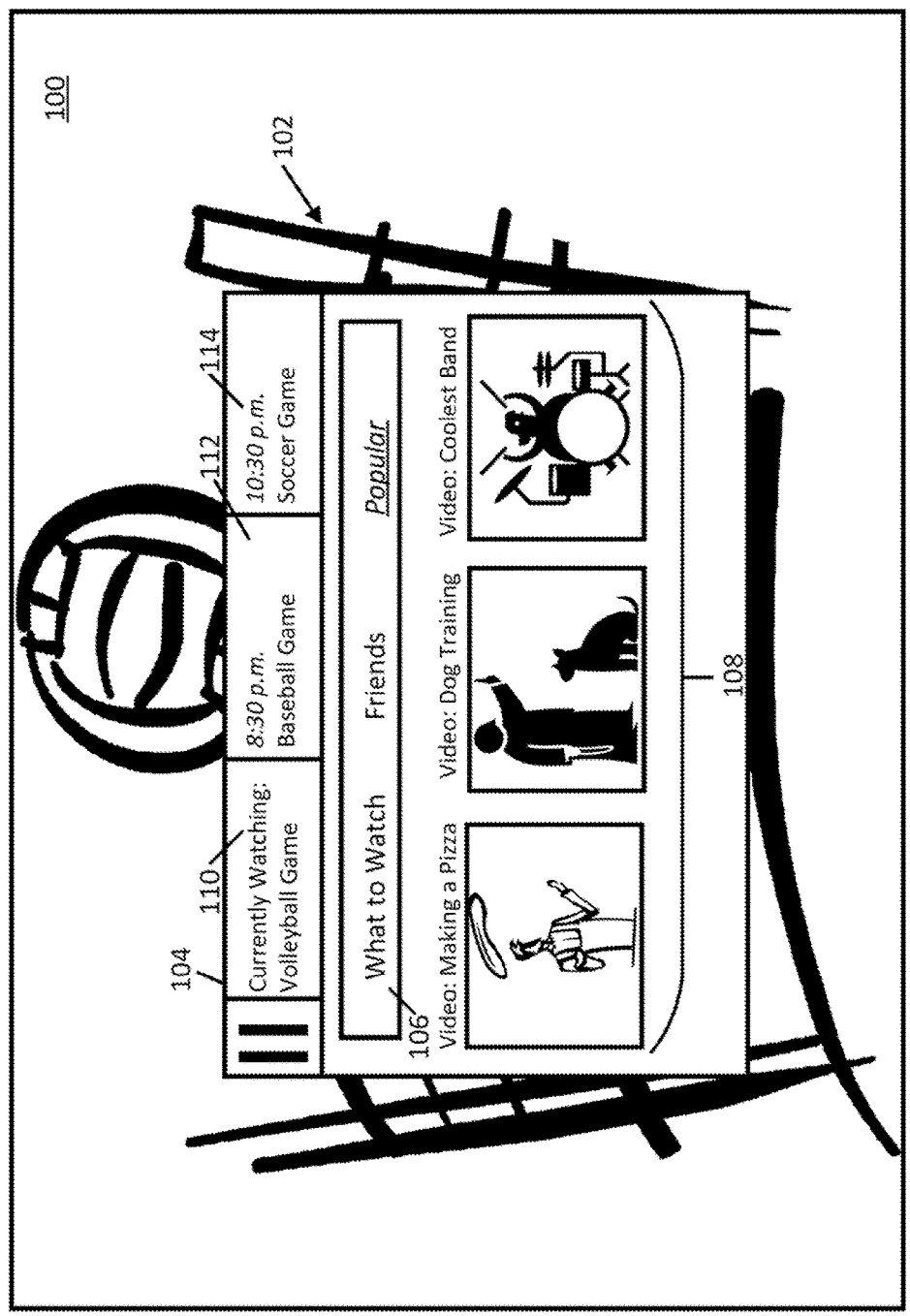
FIG. 1 shows an example of a user interface for presenting a media content item and recommendations for other media content in accordance with some embodiments of the disclosed subject matter.

In accordance with various embodiments, mechanisms (which can include methods, systems, and media) for facilitating user interactions while watching media content are provided.

In some embodiments, the mechanisms can cause a media content item to be presented on a first user device associated with a first user. The mechanisms can then determine that a second user device associated with a second user is currently presenting the same media content item. In some embodiments, the mechanisms can then present, on the first user device, an indication that the second user device is presenting the same media content item.

In some embodiments, the mechanisms can cause a communication interface between the first user device and the second user device to be initiated, for example, in response to determining that an input to initiate a chat between the two devices has been selected. Additionally or alternatively, the communication interface can be initiated between the second user device and a third user device associated with the first user device (e.g., in instances where the first user device and the third user device have been paired). The communication interface can then be used to transmit messages in a chat (e.g., text, images, and/or any other suitable message content), video data, and/or audio data between the two devices.

In some embodiments, messages transmitted via the communication interface can be semi-private and/or public, that is, they can be viewed by users not participating in the chat. For example, in some embodiments, the messages can be viewed by users who are connected to one or all of the users participating in the chat. As another example, in some embodiments, the messages can be viewed by the general public. In instances where the messages are semi-private and/or public, users can provide sentimental information (e.g., a thumbs up, a thumbs down, an upvote, a downvote, a like, a dislike, and/or any other suitable sentimental information) regarding a particular message. In some embodiments, an indication of sentimental information can be treated as a vote (e.g., in favor of or against the particular message), which can cause the message to increase or decrease in ranking. In some such embodiments, aggregate vote counts associated with the messages can be used to compile an aggregated feed of comments associated with the media content item, and/or for any other suitable purpose.

In some embodiments, the mechanisms described herein can be used to recommend other media content items to the first user. For example, in some embodiments, the mechanisms can identify media content items currently being viewed and/or previously viewed by users connected (e.g., in a social networking service) to the first user and can recommend the identified media content items. As another example, in some embodiments, the mechanisms described herein can receive an indication that a second user has shared a particular media content item with the first user, and can present, on the first user device, information related to the shared media content item, such as an identifier of the second user, a message sent by the second user, an identifier of the shared media content item, and/or any other suitable information. In some such embodiments, the first user can then insert the shared media content item into a queue of media content items created by the first user.

Turning to FIG. 1, an example 100 of a user interface for presenting a media content item and suggestions of other media content items is shown in accordance with some embodiments of the disclosed subject matter. As illustrated, user interface 100 can include a presentation of a media content item 102, a queue of media content items 104, and a group of recommendations 108.

Presentation 102 can include any suitable presentation of a media content item on a user device. For example, presentation 102 can be a presentation of a video, a movie, a television program, an audiobook, and/or any other suitable type of media content item. In some embodiments, presentation 102 can include a video player window in which the media content item is presented. In some embodiments, presentation 102 can additionally include any suitable controls, such as controls to adjust a volume of presentation 102, fast-forward and/or rewind presentation 102, pause presentation 102, and/or any other suitable controls.

Queue 104 can include any suitable indications of media content a user device is currently presenting and/or media content that has been selected for future presentation. For example, as shown in FIG. 1, queue 104 can include an indication of current content 110, an indication of second content 112, and an indication of third content 114. In some embodiments, indication of current content 110 can identify media content associated with presentation 102, and indication of second content 112 and indication of third content 114 can identify media content that has been queued for presentation after presentation 102 has finished. As shown in FIG. 1, indications 110, 112, and 114 can include a title of the corresponding media content item and a time at which the corresponding media content item is to be presented. Additionally or alternatively, in some embodiments, indications 110, 112, and 114 can include any other suitable content, such as a name of a creator of the media content item, a channel on which the media content item is being presented, an image representing the media content item, and/or any other suitable information. Note that, in some embodiments, any suitable number of indications can be presented in queue 104. In some embodiments, queue 104 can be omitted.

Group of recommendations 108 can include any suitable media content items that are recommended for a user viewing presentation 102. As shown in FIG. 1, an individual recommendation within group of recommendations 108 can include any suitable content. For example, the individual recommendation can include a title associated with the media content and/or an image associated with the media content. In some embodiments, any other suitable content can be included, such as a name of a channel associated with the media content, a name of a creator of the media content, a number of times the media content has been viewed, and/or any other suitable information. Note that, although only three recommendations are shown in group of recommendations 108, in some embodiments, any suitable number (e.g., zero, two, five, ten, and/or any other suitable number) can be included.

Individual recommendations in group of recommendations 108 can be identified based on any suitable criteria. For example, in some embodiments, individual recommendations can be determined by identifying media content that is popular (e.g., has been viewed more than a predetermined number of times, has been viewed more than a predetermined number of times over a particular time period, has been commented on and/or shared more than a predetermined number of times, and/or any other suitable popularity metric). As another example, in some embodiments, individual recommendations can be determined by identifying media content that has been viewed by users who are connected to a user viewing presentation 102 (e.g., users who are connected on a social networking service, users who have previously commented on content shared by the user viewing presentation 102, and/or any other suitable type of connection), as shown in and described below in connection with FIG. 4. In some embodiments, criteria by which recommendations are determined can be selected using a recommendations criteria input 106 as shown in FIG. 1. Recommendations criteria input 106 can include indications of different criteria by which recommendations can be selected (e.g., "Friends," "Popular," and/or any other suitable criteria). In some embodiments, selection of a particular indication can cause recommendations that are identified using the corresponding criteria to be presented in group of recommendations 108.

Figure 2A:
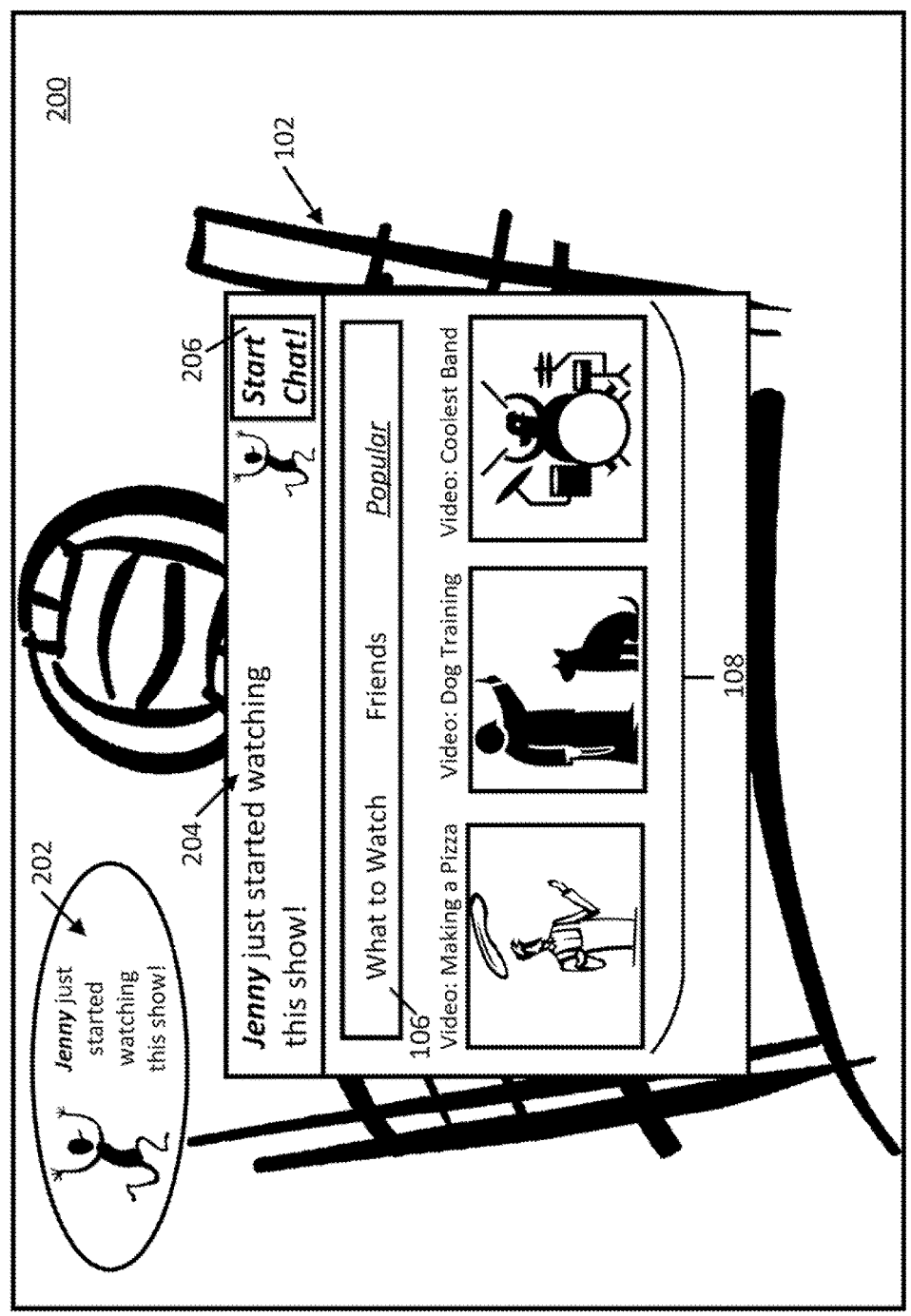
FIGS. 2A-2D show examples of user interfaces for presenting an indication that a second user is viewing the same media content item as a first user, and for creating a communication interface for transmitting messages between the first and second user in accordance with some embodiments of the disclosed subject matter.
Figure 2B:
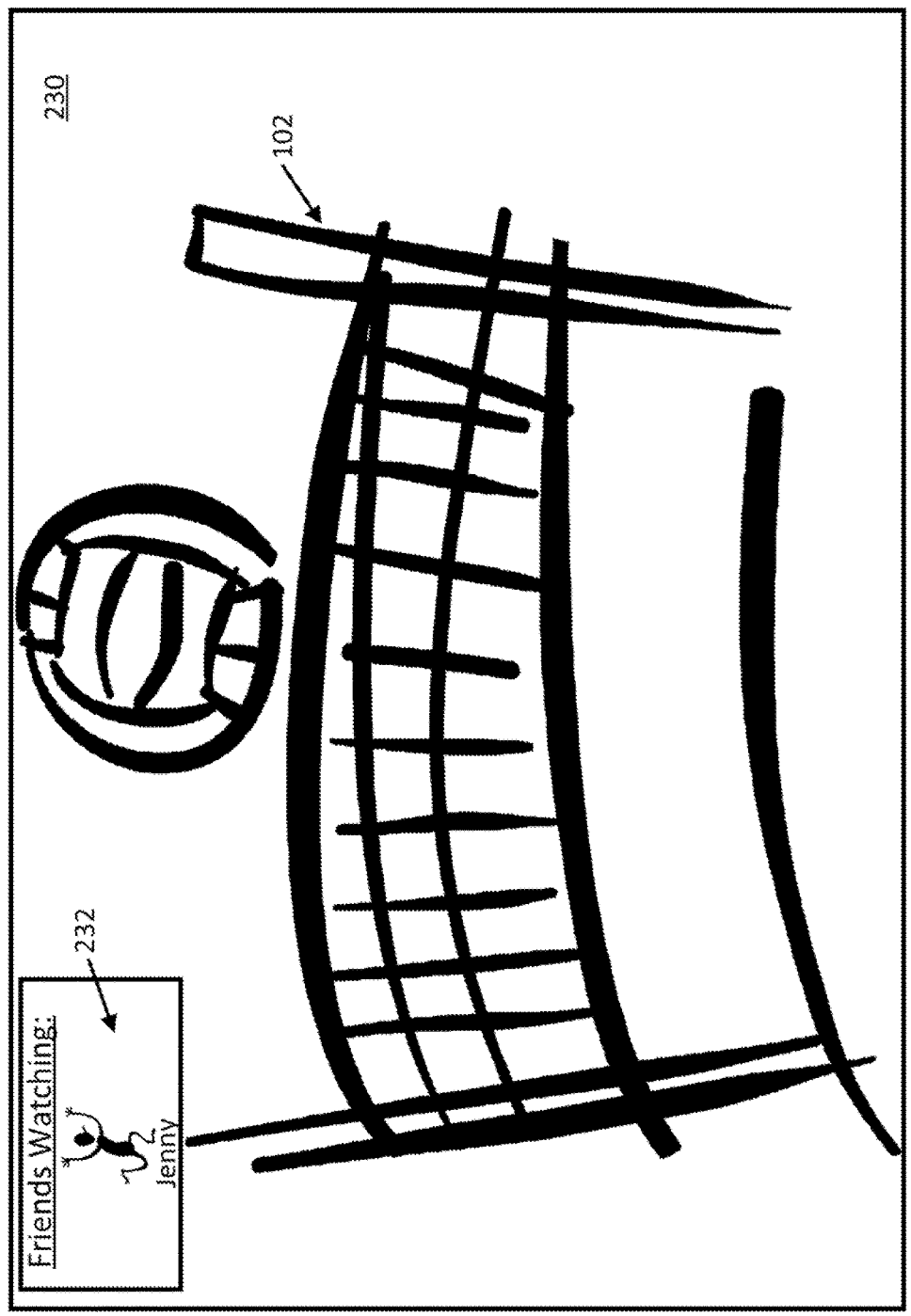

In some embodiments, an indication that a second user connected to a first user viewing presentation 102 is also viewing the same content can be presented, as shown in user interfaces 200 and 230 of FIGS. 2A and 2B. As illustrated, user interface 200 can include indicators 202 and 204 as well as a selectable input to initiate a conversation 206.

Indicators 202 and 204 can include any suitable indications that the second user is viewing the same content (e.g., presentation 102) as the first user. For example, as shown in FIG. 2A, indicators 202 and 204 can include a name of the second user, an image associated with the second user, and/or any other suitable information. Note that, although two indicators are shown in FIG. 2A, in some embodiments, any suitable number (e.g., zero, one, two, three, and/or any other suitable number) can be included.

Selectable input 206 can be any suitable user interface element for initiating a communication interface to transmit messages between a first user device presenting user interface 200 and a second user device associated with the second user. For example, as shown in FIG. 2A, selectable input 206 can include a push button. Note that, in some embodiments, selectable input 206 can be omitted, and the communication interface can be initiated based on any other suitable input. For example, in some embodiments, selection of indicators 202 and/or 204 or a portion of indicators 202 and/or 204 can cause the communication interface to be initiated.

In some embodiments, an indicator 232 representing the second user can be presented in a small portion of the user interface in which presentation 102 is being presented, as shown in FIG. 2B. For example, indicator 232 can be presented in a corner of user interface 230. In some embodiments, if multiple users who are connected to the user viewing presentation 102 are also watching the same content, indicator 232 can include information about any suitable subset of the connected users. For example, in some embodiments, indicator 232 can include information about the subset of the connected users who have most recently interacted with the user viewing presentation 102, the subset of the connected users who have had the most interactions with the user viewing presentation 102, and/or any other suitable subset. In some embodiments, the subset of users included in indicator 232 can include any suitable number (e.g., one, two, five, ten, and/or any other suitable number) of users. In some embodiments, indicator 232 can be omitted.

Figure 2C:
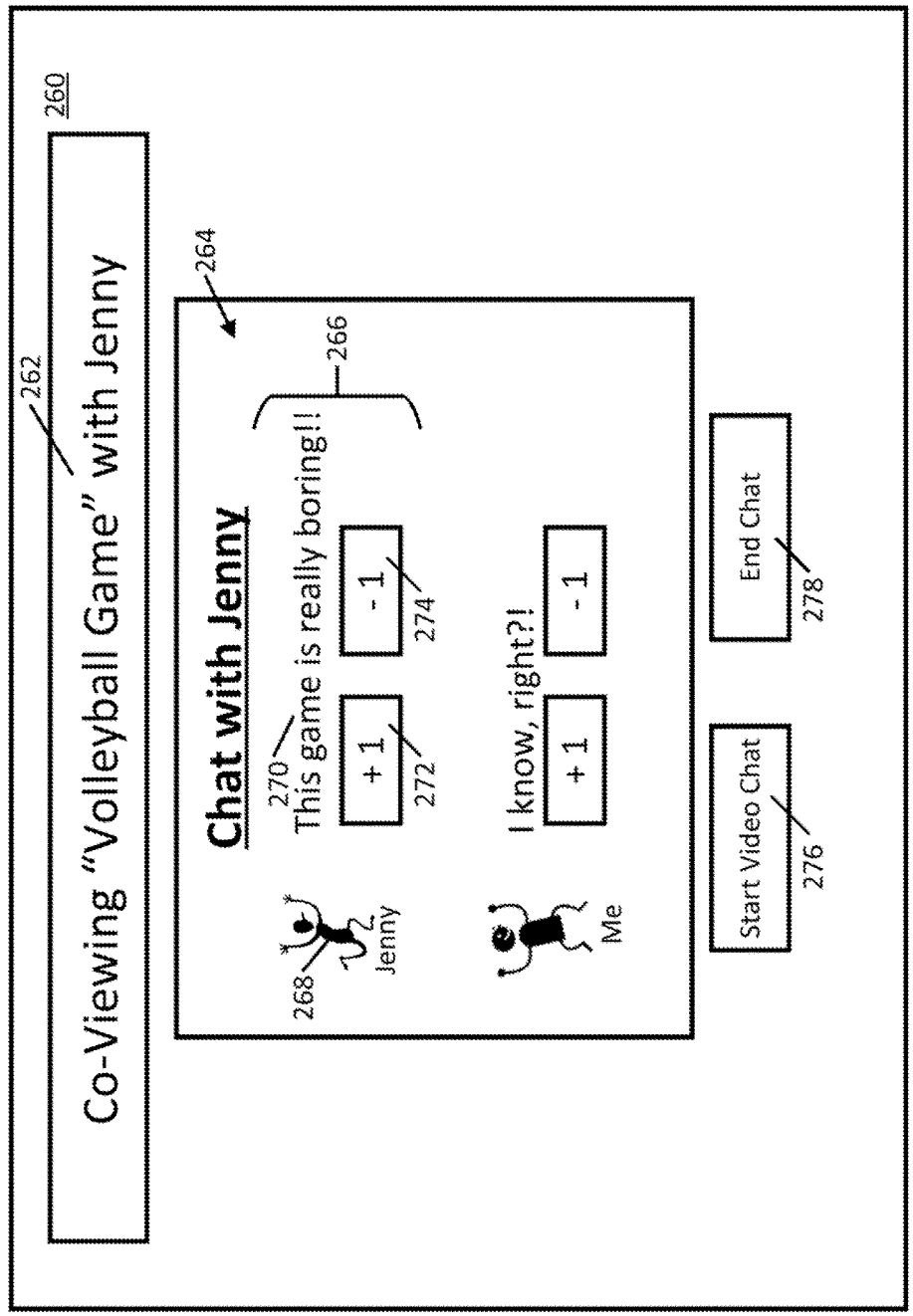

As described above in connection with FIG. 2A, in some embodiments, a communication interface for transmitting messages between two or more users who are viewing the same media content item can be initiated. FIG. 2C shows an example 260 of a user interface for presenting the communication interface. As illustrated, user interface 260 can include a title 262, a communication interface 264, and selectable inputs 276 and 278. Note that, although the communication interface is shown in FIG. 2C as being presented on the first user device, in some embodiments, the communication interface can be presented on a third user device associated with and/or paired with the first user device.

Title 262 can include any suitable indication of the content of user interface 260. In some embodiments, title 262 can include any suitable text, images, icons, graphics, animations, videos, hyperlinks, and/or any other suitable content. Note that the location of title 262 is shown as an example, and in some embodiments, title 262 can be at any suitable position in user interface 260. In some embodiments, title 262 can be omitted.

Communication interface 264 can be any suitable interface for transmitting messages between the two or more users. For example, as shown in FIG. 2C, in some embodiments, communication interface 264 can include a chat window for transmitting text and/or comments between the users. In some such embodiments, communication interface 264 can include individual comments, such as individual comment 266. In some embodiments, individual comments can be displayed within communication interface 264 as they are received. Note that, although communication interface 264 is shown as displaying text-based comments, in some embodiments, communication interface 264 can include an audio connection between participants, a video connection between participants, and/or any other suitable type of communication. In some embodiments, selectable input 276 can be used to change and/or modify a type of communication associated with communication interface 264, for example, by initiating a video connection between participants. Additionally, in some embodiments, selectable input 278 can be used to end a current connection between participants of communication interface 264.

As shown in FIG. 2C, individual comment 266 can include a user indicator 268, comment text 270, and selectable voting inputs 272 and 274. User indicator 268 can include any suitable identifying information associated with a user who entered individual comment 266. For example, as shown in FIG. 2C, user indicator 268 can include a user icon (e.g., a profile picture, an image, and/or any other suitable type of user icon), a name of the user, and/or any other suitable information.

In some embodiments, comment text 270 can include any suitable content, such as text, images, icons, graphics, animations, videos, hyperlinks, and/or any other suitable content. In some embodiments, comment text 270 can additionally indicate any suitable information associated with the comment, such as a day and/or time of transmission, and/or any other suitable information.

In some embodiments, contents of communication interface 266 can be private, semi-private, and/or public. For example, in some embodiments, the contents of communication interface 266 can be private and visible to only participants in communication interface 266. As another example, in some embodiments, the contents of communication interface 266 can be public, and can be visible to any suitable group of users (e.g., all users with accounts on a social networking service associated with communication interface 266, anyone with knowledge of a link associated with communication interface 266, and/or any other suitable group of users). As yet another example, in some embodiments, the contents of communication interface 266 can be semi-private. As a more particular example, in some embodiments, participants in communication interface 266 can indicate identities of users (e.g., by username, by email address, and/or in any other suitable manner) and/or groups of users (e.g., a group that consists of users that are connected to one of the participants in communication interface 266, a group that consists of users that are connected to all of the participants in communication interface 266, and/or any other suitable group of users) that are allowed access to the contents of communication interface 266.

In some embodiments, in instances where the contents of communication interface 266 are accessible to users other than the participants of communication interface 266 (e.g., when the contents are semi-private and/or public), users can provide sentimental information (e.g., upvote, downvote, thumbs up, thumbs down, like, dislike, and/or provide any other suitable sentimental information) corresponding to individual comments within communication interface 266, for example, using selectable inputs 272 and/or 274, respectively. In some embodiments, selection of input 272 and/or 274 can cause a running tally of votes associated with comment 266 to be updated, as described below in connection with FIG. 3. For example, in some such embodiments, selection of input 272 can cause the running tally of votes to be incremented by one, and selection of input 274 can cause the running tally of votes to be decremented by one. In some embodiments, the running tally of votes can be stored in any suitable location, such as on a server associated with communication interface 264.

Figure 2D:
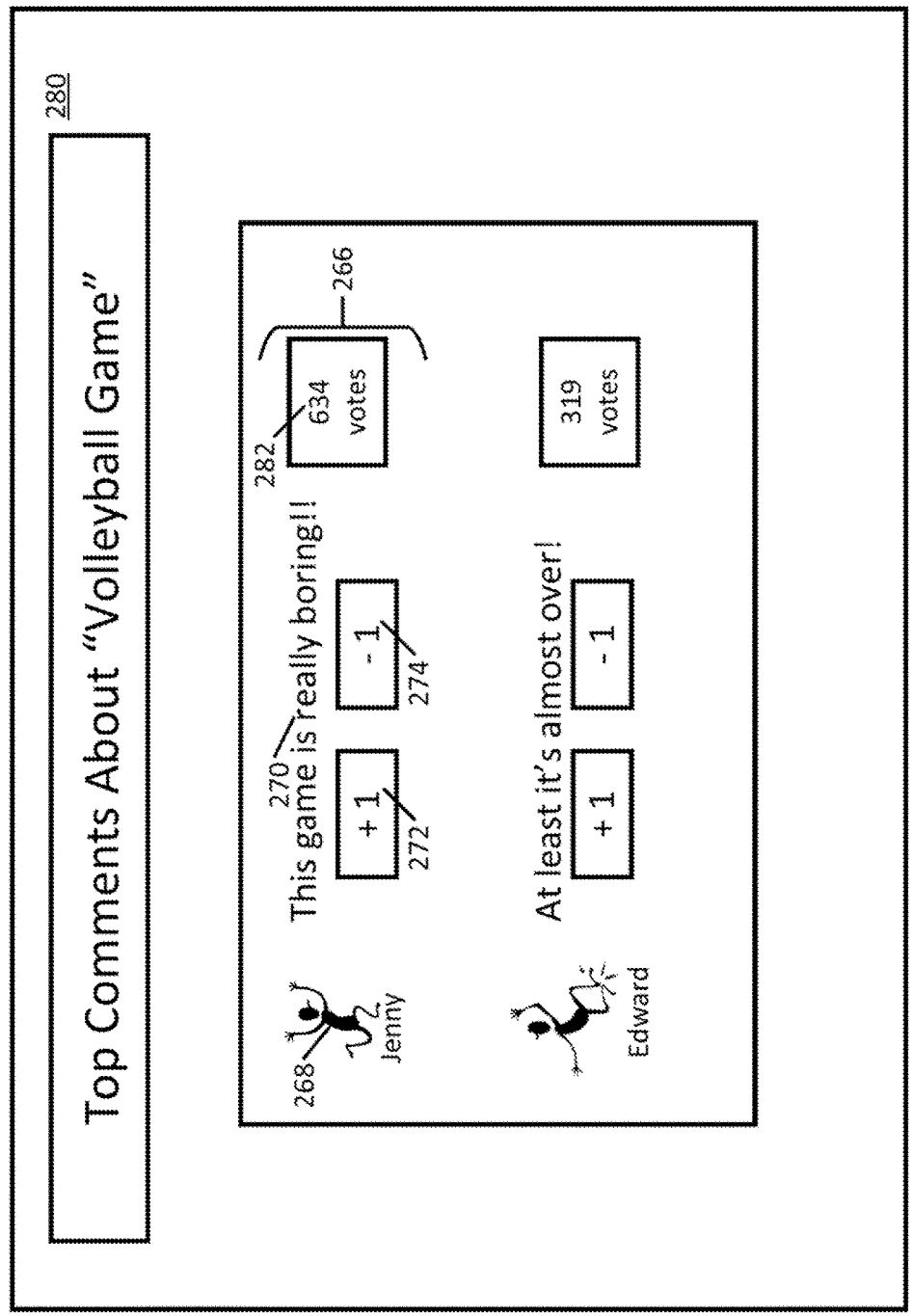

In some embodiments, in instances where comments in communication interface 264 can be associated with sentimental information (e.g., upvotes, downvotes, thumbs up, thumbs down, likes, dislikes, and/or any other suitable sentimental information) received from users, the comments can be available for presentation within an aggregated feed of comments related to the media content item, as shown in user interface 280 of FIG. 2D. For example, as shown in FIG. 2D, comments with the most votes (e.g., as shown by a vote total 282 in FIG. 2D) can be presented in the aggregated feed. In some embodiments, the comments can be presented in any suitable order, for example, with comments associated with a higher ranking (e.g., based on received sentimental information) and/or more votes presented above (or in any other suitable position) comments with a lower ranking and/or fewer votes. Note that, in some embodiments, comments can be presented in the aggregated feed based on any suitable criteria other than the number of associated votes. For example, in some embodiments, a predetermined percentage (e.g., 10%, 20%, and/or any other suitable percentage) of comments in the aggregated feed can be based on criteria such as how recently the comment was entered, a number of votes associated with other comments entered by the same user, and/or any other suitable criteria.

Additionally, note that, in some embodiments, the ranking of comments and/or votes associated with particular comments can be used for any suitable purpose, for example, as a source for real-time questions and/or commentary in connection to a news event, such as a televised debate, and/or for any other suitable purpose. As a more particular example, in some embodiments, rankings and/or votes associated with comments can be used as a polling mechanism, for example, to identify questions to ask in an interview and/or debate, to vote for and/or against contestants in a game, and/or for any other suitable purpose. As another more particular example, in some embodiments, rankings and/or votes associated with comments can be used for fact-checking live commentary associated with a televised interview and/or political debate.

In some embodiments, comments associated with more than a predetermined number (e.g., more than 100, more than 1000, and/or any other suitable number) of votes and/or a higher ranking can be presented to users not participating in the chat who are also viewing the same media content item. For example, in some embodiments, the comments can be overlaid on a presentation of the media content item (e.g., in a banner at the top and/or bottom of a screen, and/or at any other suitable location). Additionally or alternatively, in some embodiments, users who entered comments associated with a higher ranking and/or more than a predetermined number of votes can be invited (e.g., by a network provider associated with the media content item) to participate in a group chat.

Note that, in some embodiments, sentimental information (e.g., upvotes, downvotes, a thumbs up, a thumbs down, likes, dislikes, and/or any other sentimental information) can be received corresponding to an entire chat and/or communication interface. In some embodiments, the received sentimental information can be used to rank the entire chat and/or communication interface. In some such embodiments, participants in particular chats (e.g., in chats that have received more than a predetermined number of votes, in chats identified based on any other suitable criteria) can be invited to participate in a different public chat. As a specific example, a network provider associated with the media content item that is a topic of a particular chat can request that one or more participants in a chat with a relatively high ranking and/or more than a predetermined number of votes participate in and/or join a different group chat.

Figure 3:
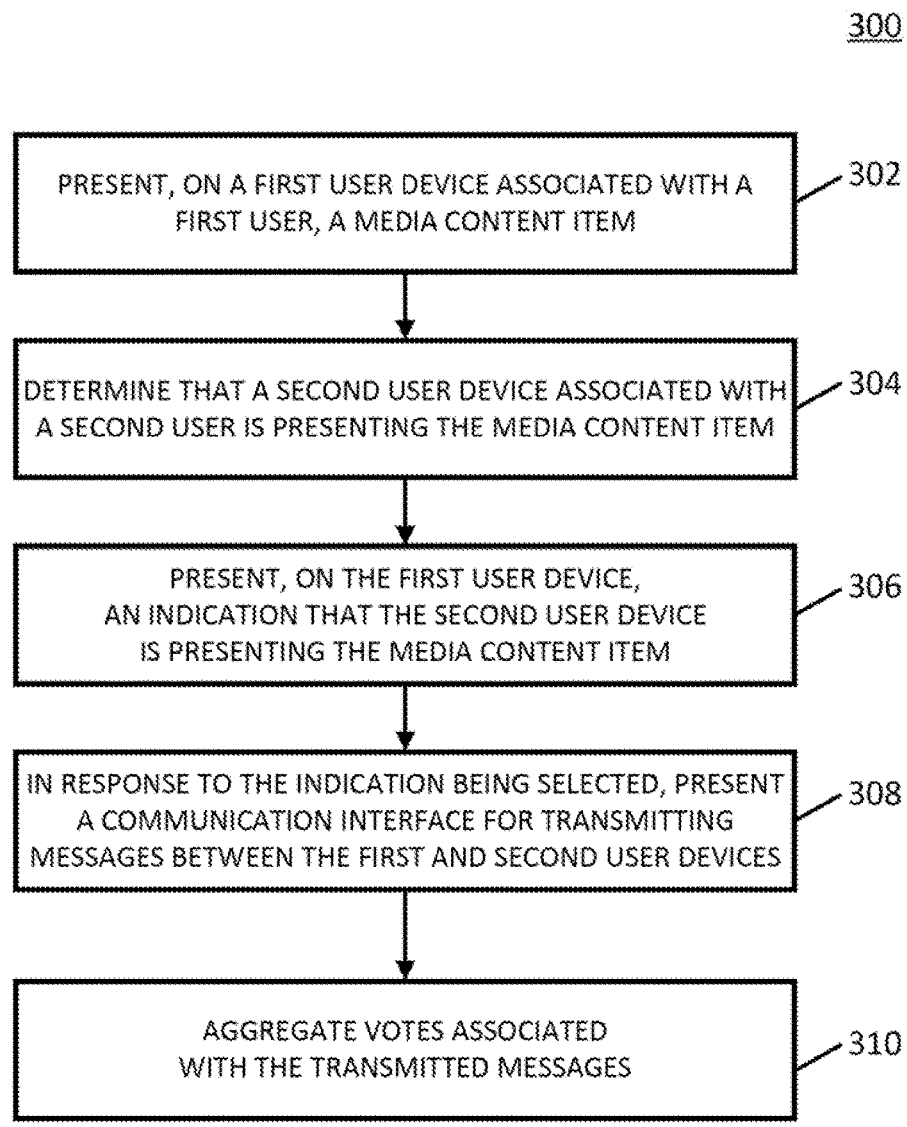
FIG. 3 shows an example of a process for determining that a second user is viewing the same media content item as a first user and creating a communication interface for transmitting messages between the first and second user in accordance with some embodiments of the disclosed subject matter.

FIG. 3 shows an example 300 of a process for initiating a communication interface between participants watching the same media content in accordance with some embodiments of the disclosed subject matter.

Process 300 can begin by presenting a media content item on a first user device associated with a first user at 302. The media content item can be presented in any suitable manner. For example, in some embodiments, process 300 can begin presenting the media content item in a media player window in response to receiving a selection of the media content item from the first user device. In some embodiments, process 300 can cause the media content item to be streamed to the first user device from any suitable location, such as a content server, as shown in and described below in connection with FIG. 7.

Process 300 can determine that a second user device associated with a second user is presenting the media content item at 304. In some embodiments, the second user can be one who is connected to the first user via a social networking service. For example, in some embodiments, the first user and the second user can be directly connected (e.g., listed as friends on a social networking service, have directly shared content with each other in the past, and/or any other suitable type of direct connection) via the social networking service. Process 300 can use any suitable technique or combination of techniques to determine that the second user device is presenting the media content item. For example, in some embodiments, process 300 can identify media content items currently being viewed by connections of the first user to determine if any connected users are currently viewing the same media content item as the first user. In some such embodiments, identifiers of media content items that are currently being viewed can be stored in any suitable manner, such as in a database on a content server and/or in a data server, as shown in and described below in connection with FIG. 7.

Process 300 can present, on the first user device, an indication that the second user device is presenting the same media content item at 306, as shown in and described above in connection with FIGS. 2A and 2B. In some embodiments, the indication can include any suitable information, such as a name of a user associated with the second user device, an image associated with the second user device, and/or any other suitable information. In some embodiments, the indication can additionally include a selectable input to initiate a chat (e.g., an instant messaging chat, a video call, an audio call, and/or any other suitable type of chat) between the first user device and the second user device, as shown in and described above in connection with FIG. 2A.

Process 300 can present a communication interface for transmitting messages between the first user device and the second user device at 308. In some embodiments, process 300 can present the communication interface in response to determining that the selectable input to initiate a chat (as described above in connection with block 306 and as shown in and described above in connection with FIG. 1A) has been selected. The communication interface can be presented in any suitable manner. For example, as shown in FIG. 2C, the communication interface can present text and/or images transmitted between the first user device and the second user device. As another example, the communication interface can present video associated with a video call between the first user device and the second user device. Note that, in some embodiments, the communication interface can be closed in response to determining that presentation of the media content item has finished.

Note that, in some embodiments, the communication interface can be presented on a third user device associated with the first user device and can transmit messages between the second user device and the third user device. As a specific example, if the first user device presenting the media content item is a television, process 300 can cause the communication interface to be presented on a third user device, such as a tablet computer or a mobile phone. In some embodiments, the third user device can be associated and/or paired with the first user device using any suitable technique(s) (e.g., any suitable device discovery protocol(s), and/or any other suitable technique(s)) at any suitable time (e.g., prior to media content first being presented, during presentation of the media content, after presentation of an indication that the second user device is presenting the same media content, and/or at any other suitable time).

As described above in connection with FIGS. 2C and 2D, in some embodiments, contents of the communication interface can be semi-private or public. In some such embodiments, users who can view the comments (e.g., including users not participating in the chat) can provide sentimental information (e.g., upvotes, downvotes, thumbs up, thumbs down, likes, dislikes, and/or any other sentimental information) corresponding to particular comments within the communication interface, and the sentimental information can be used for increasing or decreasing the ranking of the comments. In such embodiments, process 300 can aggregate votes associated with the transmitted messages at 310. For example, process 300 can receive an indication that a particular comment was upvoted and/or downvoted, and process 300 can increment and/or decrement, respectively, an aggregated number of votes associated with the comment. In some embodiments, the aggregated number of votes can be stored in any suitable location, such as on a data server, as shown in and described below in connection with FIG. 7.

Note that, as described above in connection with FIG. 2D, the aggregated number of votes can be used for any suitable purpose. For example, as shown in and described above in connection with FIG. 2D, the aggregated votes can be used to compile an aggregated feed of comments related to the media content item being presented. As a more particular example, comments with a relatively high number of votes can be presented in the aggregated feed. As another example, in some embodiments, comments can be selected based on the aggregated number of votes to be used as live commentary and/or live questions in connection with a news event such as a debate. As yet another example, in some embodiments, users associated with comments with relatively high numbers of votes can be invited to participate in a different, public chat.

Figure 4:
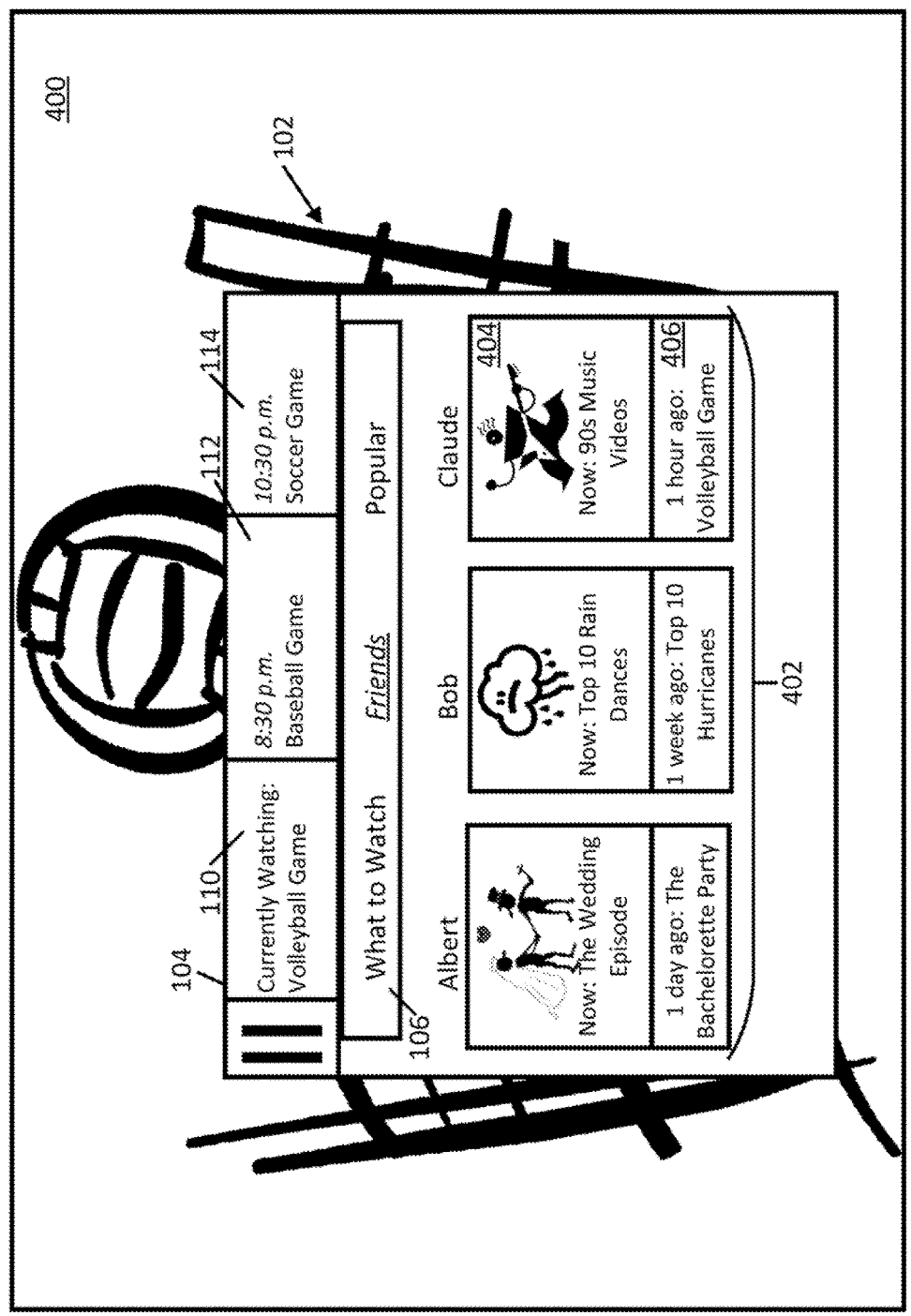
FIG. 4 shows an example of a user interface for presenting indications of media content items that users connected to a first user have viewed and/or are viewing in accordance with some embodiments of the disclosed subject matter.

Referring back to FIG. 1, in some embodiments, a group of recommendations of additional media content can be presented based on any suitable criteria, such as popularity of media content items, media content items that other users are viewing, and/or any other suitable criteria. FIG. 4 shows an example 400 of a user interface for presenting, to a first user, media content recommendations based on the media content that users connected to the first user (e.g., via a social networking service) are viewing and/or have previously viewed. As illustrated, user interface 400 can include group of recommendations 402.

Group of recommendations 402 can include any suitable indications of media content that users connected to the first user have viewed and/or are viewing. Note that, although media content viewed by three different users is shown in group of recommendations 402, in some embodiments, media content viewed by any suitable number (e.g., one, two, five, ten, and/or any other suitable number) of users can be presented.

An individual recommendation within group of recommendations 402 can include any suitable information. For example, as shown in FIG. 4, an individual recommendation can indicate a name of the user associated with the recommendation. Additionally, as shown in FIG. 4, the individual recommendation can include an indication 404 of currently viewed media content and an indication 406 of previous viewed media content. Indications 404 and 406 can each include any suitable information, such as a name associated with the media content (e.g., a title of the media content, a creator of the media content, a name of a channel on which the media content was presented, and/or any other suitable names) and/or an image associated with the media content. Additionally, indication 406 can indicate a time when the previously viewed media content was viewed (e.g., an hour ago, a week ago, a month ago, and/or any other suitable time). In some embodiments, selection of indications 404 and/or 406 can cause the corresponding media content item to begin playing and/or to be inserted into queue 104.

Note that, in some embodiments, an individual recommendation within group of recommendations 402 can be included based on any suitable criteria. For example, in some embodiments, an individual recommendation can be included due to the user associated with the recommendation indicating that their media content choices are to be shared with the user viewing user interface 400. As a more particular example, in some such embodiments, the user associated with the individual recommendation can indicate (e.g., via a user preferences interface) one or more users with whom their media content choices are to be shared. In some such embodiments, confirmation and/or consent from the one or more users viewing the content recommendations may be requested before recommendations are presented.

Figure 5A:
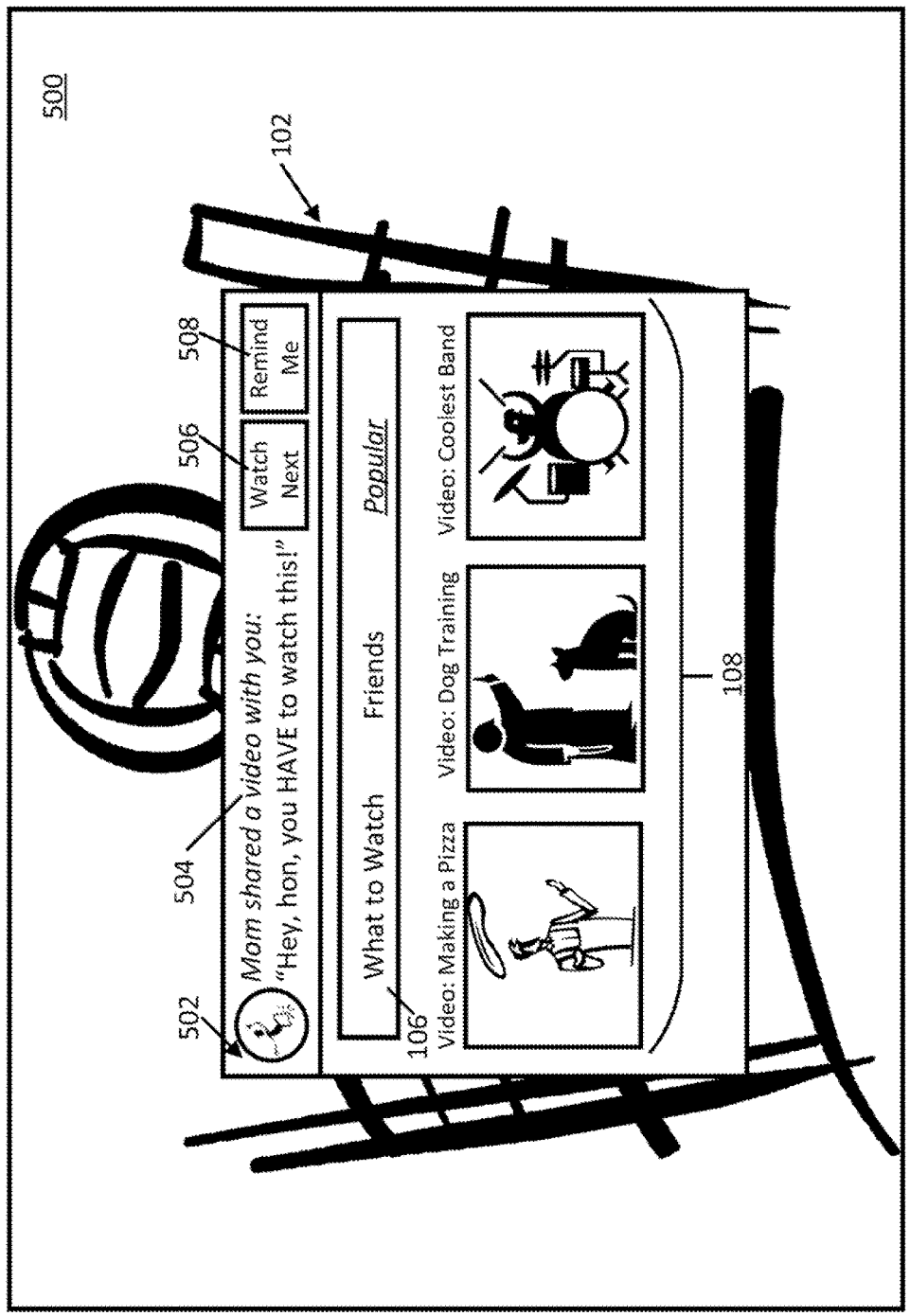
FIGS. 5A and 5B show examples of user interfaces for receiving a recommendation of a media content item and inserting the recommended media content item in a queue of media content items in accordance with some embodiments of the disclosed subject matter.

In some embodiments, a recommendation of a media content item to a first user can be shared directly by a second user. FIG. 5A shows an example 500 of a user interface for receiving the recommendation on a user device associated with the first user, in accordance with some embodiments of the disclosed subject matter. As illustrated, user interface 500 can include a recommendation indication 502.

Recommendation indication 502 can include any suitable content, such as text 504 associated with the recommendation, a selectable input 506 to insert the content into a queue, and a selectable input 508 to remind the user to watch the recommended content at a later time.

Text 504 can include any suitable content associated with the recommendation. For example, as shown in FIG. 5A, text 504 can include a name of the user sharing the media content and a comment associated with the recommendation. In some embodiments, any other suitable content can be presented in connection with text 504, such as an icon associated with the user sharing the media content, an image representing the shared media content, and/or any other suitable content.

Figure 5B:
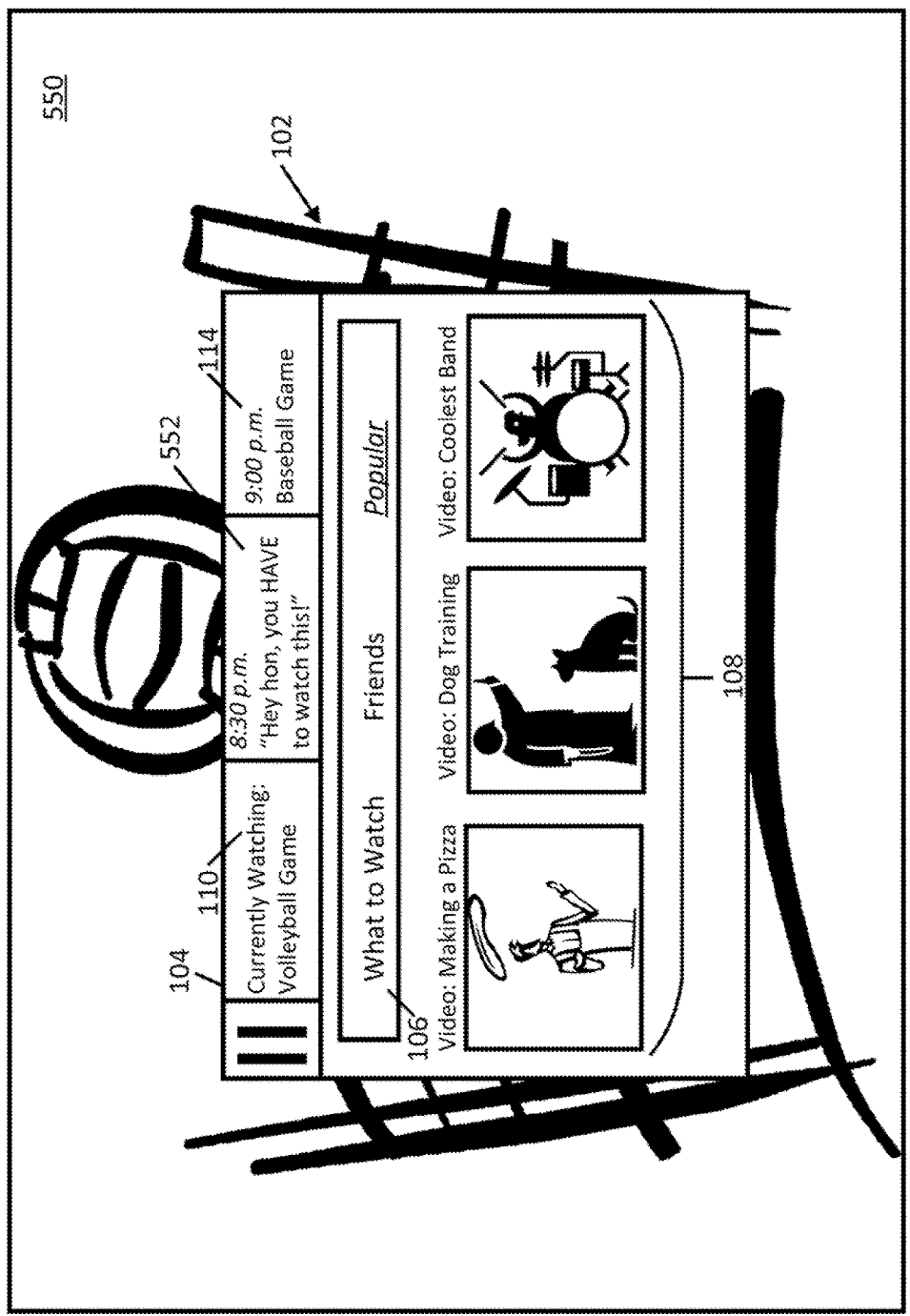

Selectable input 506 can be used to insert the recommended content in a queue. For example, in instances where a user has created a queue of content to watch (as shown in and described above in connection with FIG. 1A), selection of input 506 can cause the recommended content to be inserted into the queue (e.g., to be watched as soon as the current program is finished, and/or at any other suitable position in the queue). The recommended content can be inserted into the queue in any suitable manner. For example, as shown in user interface 550 of FIG. 5B, a recommendation indication 552 can be inserted in queue 104. In some embodiments, recommendation indication 552 can include a time at which the recommended content is to be presented, as well as any other suitable information, such as text 504, a name of a user associated with the recommendation, an image associated with the recommended content, and/or any other suitable information. Note that, although the recommended content is shown in FIG. 5B as inserted into the first position of the queue (e.g., to be presented immediately after the content that is currently being presented), in some embodiments, the recommended content can be inserted into the queue at any suitable position.

Selectable input 508 can be used to remind the user to watch the recommended content at a later time. For example, in some embodiments, selection of input 508 can cause a message (e.g., a text message, an email, a pop-up notification, and/or any other suitable type of message) to be presented at a later time (e.g., the next day, the next week, the next month, and/or any other suitable later time), suggesting that the user watch the recommended content. In some embodiments, selectable input 508 can be omitted.

Figure 6:
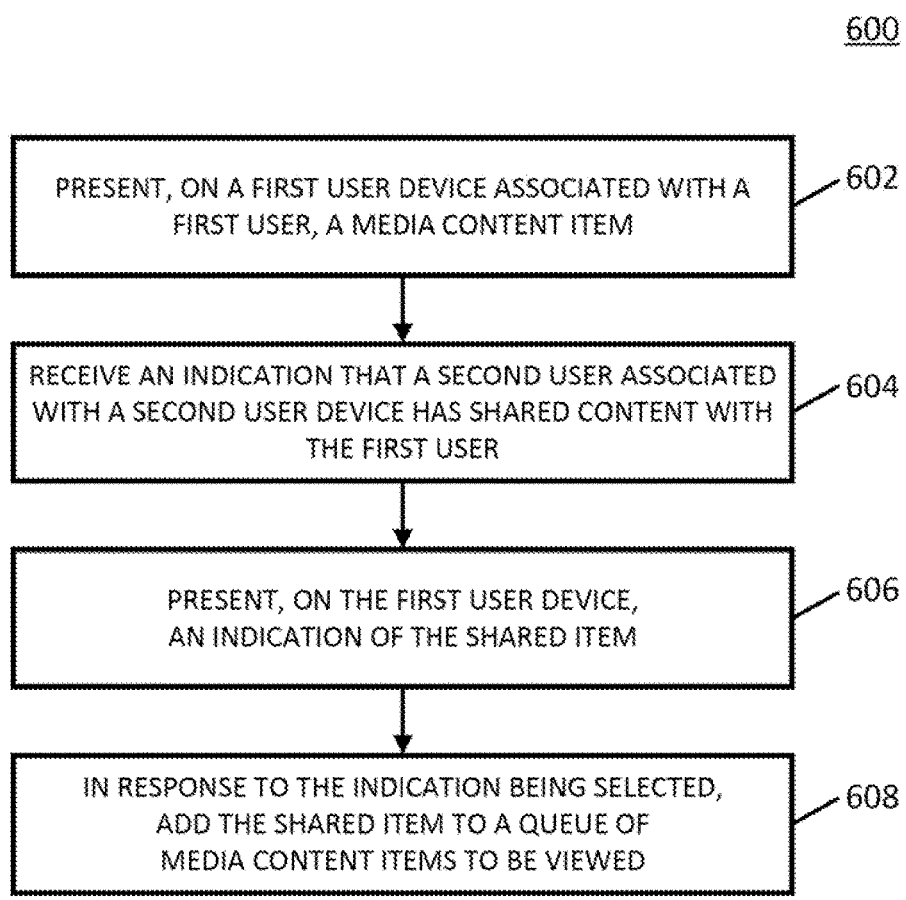
FIG. 6 shows an example of a process for receiving a recommendation of a media content item and inserting the recommended media content item in a queue of media content items in accordance with some embodiments of the disclosed subject matter.

Turning to FIG. 6, an example 600 of a process for inserting a recommended content item into a queue is shown in accordance with some embodiments of the disclosed subject matter.

Process 600 can begin by presenting a media content item on a first user device associated with a first user at 602. The media content item can be presented in any suitable manner. For example, in some embodiments, process 600 can begin presenting the media content item in a media player window in response to receiving a selection of the media content item from the first user device. In some embodiments, process 600 can cause the media content item to be streamed to the first user device from any suitable location, such as a content server, as shown in and described below in connection with FIG. 7.

Process 600 can receive an indication that a second user associated with a second user device has shared content with the first user at 604. The indication can be received based on any suitable information. For example, in some embodiments, process 600 can receive information from the second user device that indicates an identifier associated with the shared content (e.g., a name of the shared content, a Uniform Resource Locator (URL) associated with the shared content, and/or any other suitable identifier) and an identifier of the first user and/or first user device (e.g., a username associated with the first user, an email address associated with the first user, and/or any other suitable identifier).

Note that, although the indication from the second user is described above in FIGS. 5A and 5B as a recommendation of content to view, in some embodiments, the indication can be presented as a notification of content that the second user is currently and/or has recently viewed. For example, in some embodiments, the notification can be presented in response to determining that the second user has indicated that the second user wants to share an indication of currently viewed content with the first user. As another example, in some embodiments, the notification can be presented in response to determining that the second user has specified (e.g., via a user preferences interface) that an indication of content the second user is viewing is to always be presented to the first user. In some embodiments, confirmation by the first user that notifications from the second user are allowed to be presented may be requested (e.g., via a user interface requesting confirmation of a relationship between the first user and the second user, and/or in any other suitable manner) before notifications are presented.

Process 600 can present an indication of the shared content item on the first user device at 606. The indication can be presented in any suitable manner. For example, as shown in and described above in connection with FIG. 5A, the indication can include a name and/or username associated with the second user, an image of the second user, a message from the second user, an image associated with the shared content, and/or any other suitable content. Additionally, the indication can be presented at any suitable location on the first user device. For example, as shown in FIG. 5A, the indication can be presented within a user interface that is currently being used to present a media content item. Alternatively, in some embodiments, the indication can be presented on a third user device associated and/or paired with the first user device.

Process 600 can add the shared content item to a queue of content items associated with the first user device at 608. In some embodiments, the shared content item can be added to the queue in response to determining that a selectable input included in the indication has been selected, as shown in and described above in connection with FIGS. 5A and 5B. The shared content item can be added to the queue of content items in any suitable manner. For example, as shown in and described above in connection with FIGS. 5A and 5B, the shared content item can be inserted into the queue in a position such that the shared content item begins playing immediately after a content item that is currently being presented finishes. Additionally or alternatively, in some embodiments, the shared content item can be inserted at any other suitable position in the queue.

Figure 7:
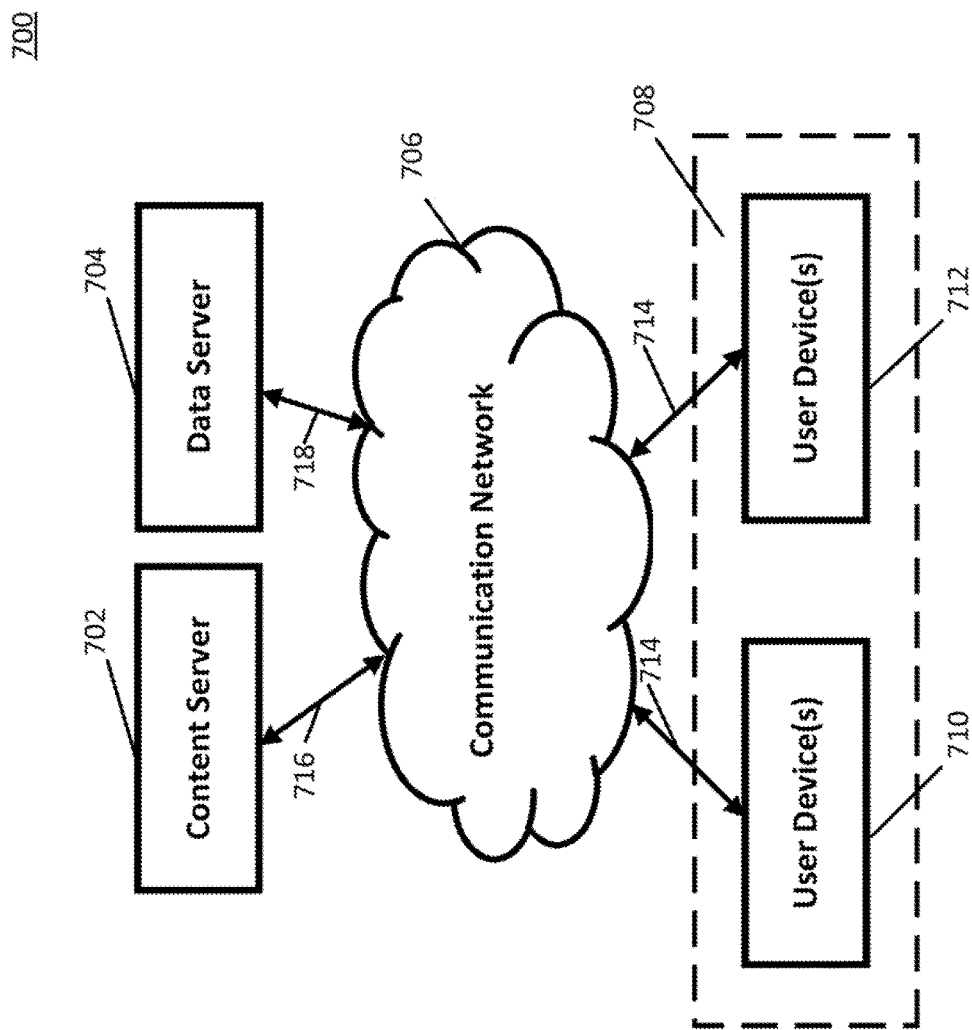
FIG. 7 shows a schematic diagram of an illustrative system suitable for implementation of mechanisms described herein for facilitating user interactions while watching media content in accordance with some embodiments of the disclosed subject matter.

Turning to FIG. 7, an example 700 of hardware for facilitating user interactions while watching media content that can be used in accordance with some embodiments of the disclosed subject matter is shown. As illustrated, hardware 700 can include one or more servers such as a content server 702 and a data server 704, as well as a communication network 706, and/or one or more user devices 708, such as user devices 710 and 712.

In some embodiments, content server 702 can be any suitable server for storing media content and/or delivering such media content to user device 708. For example, content server 702 can be a server that streams and/or otherwise transmits media content to user device 708 via communication network 706. Media content provided by content server 702 can be any suitable content, such as video content, audio content, electronic books, documents, images, and/or any other suitable type of media content. As a more particular example, media content can include television programs, movies, cartoons, sound effects, live-streamed content (e.g., a streaming radio show, a live concert, and/or any other suitable type of streaming live content), and/or any other suitable type of media content. Media content can be created and/or uploaded to content server 702 by any suitable entity. For example, in some embodiments the media content can include user-generated content. As another example, in some embodiments, the media content can include content created and/or uploaded by a particular group and/or channel. In some embodiments, media content stored on content server 702 can be stored in association with an indicator of a creator and/or uploader of the media content. In some embodiments, content server 702 can be omitted.

In some embodiments, data server 704 can be any suitable server for storing information related to media content viewed on particular user devices, aggregating votes associated with particular comments associated with a media content item, and/or for performing any other suitable actions. For example, in some embodiments, data server 704 can identify a second user device associated with a second user that is currently presenting the same media content item being presented on a first user device associated with a first user, as described above in connection with FIG. 3. As another example, in some embodiments, data server 704 can receive an indication that a particular comment included in a communication interface has received sentimental information corresponding to an increase or decrease in ranking of the comment, and can update an aggregated vote count associated with the particular comment based on the received indication, as described above in connection with FIG. 3. As yet another example, in some embodiments, data server 704 can store information indicating media content items that a user has previously watched, which can be used to create recommendations of media content, as shown in and described above in connection with FIG. 4. As still another example, in some embodiments, data server 704 can store information relating to a queue of media content items that a user intends to watch, described in connection with FIGS. 1, 5A, 5B, and 6. In some embodiments, data server 704 can be omitted.

Communication network 706 can be any suitable combination of one or more wired and/or wireless networks in some embodiments. For example, communication network 706 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 708 can be connected by one or more communications links 714 to communication network 706 that can be linked via one or more communications links (e.g., communications links 716 and/or 718) to content server 702 and data server 704. Communications links 714, 716, and/or 718 can be any communications links suitable for communicating data among user devices 708 and servers 702 and/or 704 such as network links, dial-up links, wireless links, hard-wired links, any other suitable communications links, or any suitable combination of such links.

In some embodiments, user devices 708 can include one or more computing devices suitable for receiving a message indicating availability of a new video, presenting the new video in a user interface that includes a communication interface for a group conversation, and/or any other suitable functions. For example, in some embodiments, user devices 708 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 708 can be implemented as a non-mobile device such as a desktop computer, a set-top box, a television, a streaming media player, a game console, and/or any other suitable non-mobile device.

Although content server 702 and data server 704 are illustrated as separate devices, the functions performed by content server 702 and data server 704 can be performed using any suitable number of devices in some embodiments. For example, in some embodiments, the functions performed by either of content server 702 and data server 704 can be performed on a single server. As another example, in some embodiments, multiple devices can be used to implement the functions performed by content server 702 and/or data server 704.

Although two user devices 710 and 712 are shown in FIG. 7, any suitable number of user devices, and/or any suitable types of user devices, can be used in some embodiments.

Figure 8:
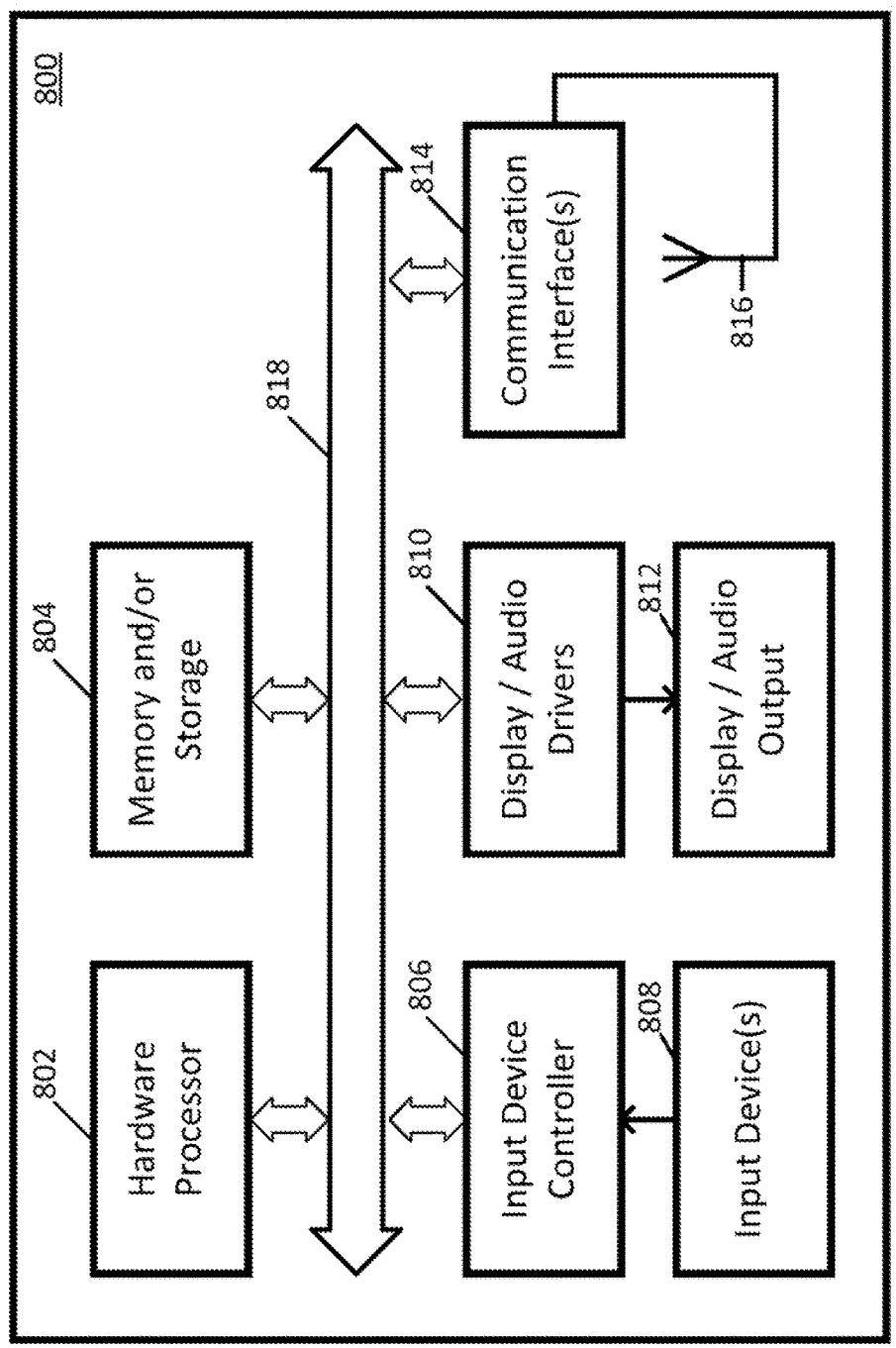
FIG. 8 shows a detailed example of hardware that can be used in a server and/or a user device of FIG. 7 in accordance with some embodiments of the disclosed subject matter.

Content server 702, data server 704, and user devices 708 can be implemented using any suitable hardware in some embodiments. For example, in some embodiments, devices 702, 704, and 708 can be implemented using any suitable general purpose computer or special purpose computer. For example, a server may be implemented using a special purpose computer. Any such general purpose computer or special purpose computer can include any suitable hardware. For example, as illustrated in example hardware 800 of FIG. 8, such hardware can include hardware processor 802, memory and/or storage 804, an input device controller 806, an input device 808, display/audio drivers 810, display and audio output circuitry 812, communication interface(s) 814, an antenna 816, and a bus 818.

Hardware processor 802 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 802 can be controlled by a server program stored in memory and/or storage 804 of a server (e.g., such as one of servers 702 and 704). For example, the server program can cause hardware processor 802 to aggregate votes associated with a particular message and media content item, and/or perform any other suitable actions. In some embodiments, hardware processor 802 can be controlled by a computer program stored in memory and/or storage 804 of user device 708. For example, the computer program can cause hardware processor 802 to present recommendations of media content items to view, present an indication that a connected user is viewing the same media content item, and/or perform any other suitable actions.

Memory and/or storage 804 can be any suitable memory and/or storage for storing programs, data, media content, and/or any other suitable information in some embodiments. For example, memory and/or storage 804 can include random access memory, read-only memory, flash memory, hard disk storage, optical media, and/or any other suitable memory.

Input device controller 806 can be any suitable circuitry for controlling and receiving input from one or more input devices 808 in some embodiments. For example, input device controller 806 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 810 can be any suitable circuitry for controlling and driving output to one or more display/audio output devices 812 in some embodiments. For example, display/audio drivers 810 can be circuitry for driving a touchscreen, a flat-panel display, a cathode ray tube display, a projector, a speaker or speakers, and/or any other suitable display and/or presentation devices.

Communication interface(s) 814 can be any suitable circuitry for interfacing with one or more communication networks, such as network 706 as shown in FIG. 7. For example, interface(s) 814 can include network interface card circuitry, wireless communication circuitry, and/or any other suitable type of communication network circuitry.

Antenna 816 can be any suitable one or more antennas for wirelessly communicating with a communication network (e.g., communication network 706) in some embodiments. In some embodiments, antenna 816 can be omitted.

Bus 818 can be any suitable mechanism for communicating between two or more components 802, 804, 806, 810, and 814 in some embodiments.

Any other suitable components can be included in hardware 800 in accordance with some embodiments.

In some embodiments, at least some of the above described blocks of the processes of FIGS. 3 and 6 can be executed or performed in any order or sequence not limited to the order and sequence shown in and described in connection with the figures. Also, some of the above blocks of FIGS. 3 and 6 can be executed or performed substantially simultaneously where appropriate or in parallel to reduce latency and processing times. Additionally or alternatively, some of the above described blocks of the processes of FIGS. 3 and 6 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for facilitating user interactions while watching media content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for facilitating user interactions while watching media content, comprising:
   associating a first user device with a second user device, wherein the first user device and the second user device are associated with a first user;
   causing, on the first user device, a media content item to be presented;
   receiving an indication that the media content item is being presented on a third user device associated with a second user, wherein the second user is connected to the first user;
   causing, on the first user device, a selectable indication that the media content item is being presented on the third user device to be presented;
   in response to determining that the selectable indication has been selected on the first user device, causing a communication interface for exchanging messages between the second user device and the third user device to be presented on the second user device; and
   receiving indications of sentimental information associated with a particular message presented in the communication interface, wherein the sentimental information is used for ranking the particular message.

2. The method of claim 1, further comprising causing contents of the communication interface to be presented on a fourth user device associated with a third user.

3. The method of claim 1, further comprising:
   aggregating indications of sentimental information associated with the particular message presented in the communication interface; and
   presenting an aggregated feed of messages including the particular message based on the aggregated indications of sentimental information.

4. The method of claim 1, further comprising aggregating indications of sentimental information associated with a user who sent the particular message presented in the communication interface.

5. The method of claim 1, further comprising:
   determining that presentation of the media content item has finished; and
   in response to determining that presentation of the media content item has finished, causing the communication interface to be closed.

6. A system for facilitating user interactions while watching media content, the system comprising:
   a hardware processor that is programmed to:
      associate a first user device with a second user device, wherein the first user device and the second user device are associated with a first user;
      cause, on the first user device, a media content item to be presented;
      receive an indication that the media content item is being presented on a third user device associated with a second user, wherein the second user is connected to the first user;
      cause, on the first user device, a selectable indication that the media content item is being presented on the third user device to be presented;
      in response to determining that the selectable indication has been selected on the first user device, cause a communication interface for exchanging messages between the second user device and the third user device to be presented on the second user device; and
      receive indications of sentimental information associated with a particular message presented in the communication interface, wherein the sentimental information is used for ranking the particular message.

7. The system of claim 6, wherein the hardware processor is further programmed to cause contents of the communication interface to be presented on a fourth user device associated with a third user.

8. The system of claim 6, wherein the hardware processor is further programmed to:
   aggregate indications of sentimental information associated with the particular message presented in the communication interface; and
   present an aggregated feed of messages including the particular message based on the aggregated indications of sentimental information.

9. The system of claim 6, wherein the hardware processor is further programmed to aggregate indications of sentimental information associated with a user who sent the particular message presented in the communication interface.

10. The system of claim 6, wherein the hardware processor is further programmed to:
    determine that presentation of the media content item has finished; and
    in response to determining that presentation of the media content item has finished, cause the communication interface to be closed.

11. A non-transitory computer-readable medium containing computer executable instructions that, when executed by a processor, cause the processor to perform a method for facilitating user interactions while watching media content, the method comprising:
    associating a first user device with a second user device, wherein the first user device and the second user device are associated with a first user;
    causing, on the first user device, a media content item to be presented;
    receiving an indication that the media content item is being presented on a third user device associated with a second user, wherein the second user is connected to the first user;
    causing, on the first user device, a selectable indication that the media content item is being presented on the third user device to be presented;
    in response to determining that the selectable indication has been selected on the first user device, causing a communication interface for exchanging messages between the second user device and the third user device to be presented on the second user device; and
    receiving indications of sentimental information associated with a particular message presented in the communication interface, wherein the sentimental information is used for ranking the particular message.

12. The non-transitory computer-readable medium of claim 11, wherein the method further comprises causing contents of the communication interface to be presented on a fourth user device associated with a third user.

13. The non-transitory computer-readable medium of claim 11, wherein the method further comprises:
    aggregating indications of sentimental information associated with the particular message presented in the communication interface; and
    presenting an aggregated feed of messages including the particular message based on the aggregated indications of sentimental information.

14. The non-transitory computer-readable medium of claim 11, wherein the method further comprises aggregating indications of sentimental information associated with a user who sent the particular message presented in the communication interface.

15. The non-transitory computer-readable medium of claim 11, wherein the method further comprises:
   determining that presentation of the media content item has finished; and
   in response to determining that presentation of the media content item has finished, causing the communication interface to be closed.

\* \* \* \* \*